United States Patent [19]

Kalbskopf et al.

[11] 4,179,535

[45] Dec. 18, 1979

[54] METHOD OF FORMING A FIRE-RESISTANT SILICATE COATING

[75] Inventors: Reinhard Kalbskopf; Felix Trojer, both of Geneva, Switzerland

[73] Assignee: Battelle Memorial Institute, Geneva, Switzerland

[21] Appl. No.: 803,281

[22] Filed: Jun. 3, 1977

[30] Foreign Application Priority Data

Jun. 4, 1976 [CH] Switzerland .................. 7100/76

[51] Int. Cl.² .................. B05D 3/02; B05D 1/36; B05D 7/00
[52] U.S. Cl. .................. 427/206; 106/18.12; 148/6.15 R; 156/60; 252/8.1; 427/407 R; 427/372 B; 427/407 A; 427/419 R
[58] Field of Search .......... 427/372 B, 390 D, 419 R, 427/407 R, 407 A, 206; 106/18.12; 252/8.1; 148/6.15 R; 156/60

[56] References Cited

U.S. PATENT DOCUMENTS

| 2,046,296 | 6/1936 | Roos et al. ................. 106/137 X |
|---|---|---|
| 2,429,946 | 10/1947 | Roach ................. 428/450 X |
| 3,585,052 | 6/1971 | Dannewald et al. ............. 106/84 |
| 3,854,987 | 12/1974 | Michael ................. 106/84 X |

FOREIGN PATENT DOCUMENTS

| 1006917 | 10/1965 | United Kingdom ............. 427/372 X |
|---|---|---|
| 1007485 | 10/1965 | United Kingdom ............. 427/372 A |
| 1181432 | 2/1970 | United Kingdom ............. 427/372 A |
| 1384285 | 2/1975 | United Kingdom ............. 427/372 A |

*Primary Examiner*—Michael R. Lusignan
*Attorney, Agent, or Firm*—Finnegan, Henderson, Farabow & Garrett

[57] ABSTRACT

A method of protecting an object from fire damage by coating the object with a slurry made from hydrated metal silicate particles and an aqueous alkali metal silicate solution. The slurry is applied before there is significant absorption of water into the particles from the solution. Upon heating, the coating expands to form a foam which, because of the equilibrium of water formed between the particles of sodium silicate, is rigid at high temperatures.

17 Claims, No Drawings

METHOD OF FORMING A FIRE-RESISTANT SILICATE COATING

The invention relates to the fire-proof coating of substrates and, more particularly, to a self-curing alkali-metal based composition to form fire-proof coatings on substrates, such coatings becoming tumescent (self-swelling) in case of fire or high temperatures but resisting foam-flowing and collapse from vertical surfaces in such circumstances. The invention also concerns a process for the application of such compositions on substrates for making them fire-proof, the use of such fire-proof coatings for protecting substrates, e.g. building materials, against fires and also the fire-proof coatings obtained from such compositions.

There are several known categories of materials and techniques for protecting substrates, e.g. building elements against fire. Most of them are based on the use of fire-proof materials or coatings. Such materials or coatings belong to the following classes:

1. Refractory blocks: such blocks or bricks generally comprise light concrete or cement with high alumina content. Shields made with such bricks are very efficient protective means in case of fire; however, having little strength of their own, they cannot substitute regular construction elements and they must be added as additional elements which are expensive and take much of the building space available.

2. Felts and sheets of grainy or fibrous non-flammable substances. The fireproofing efficiency of such materials is dependent on the kind of fibrous or grainy compounds used. As such, one can mention asbestos, vermiculite type gypsum, clay and cinder wool, glass-wool and mineral-wool. Using such sheet panels is much simpler than using refractory blocks, however, it also requires that additional carrier elements be used in the construction of buildings. Further, the temperatures at which such sheets will be effective against fire are not very high; they cannot exceed about 400° C. when organic binders are used to coalesce the non-flammable fibrous or granular compounds. In the absence of such organic binders, temperatures of 700°–1000° C. can be accepted but not exceeded because of undesirable phenomena undergoing then with cinder or mineral wools; such phenomena are related to crystallization and structure changes within the minerals and result in embrittlement, softening and collapse of the materials when binders are not present.

3. Fireproof or fire-resistant coatings. Such coatings have the advantage that special carrier building elements are not necessary. However, they have other drawbacks. For instance, there exist coatings which are based on organic substances and the protection of which is not higher than 230° C., if long life thereof must be ensured. Other kinds of fire-proofing coatings in the form of solid layers applied to substrates are obtained by depositing at least one fluid layer of an aqueous solution of at least one alkali-metal silicate, such as sodium silicate or liquid glass, or a layer of such aqueous silicate solution wherein there is, in suspension, at least one fibrous or granulated mineral substance and, thereafter, by causing such layer to harden with partial dehydration of the aqueous alkali metal silicate layer. As mineral fibrous or granular substance, one uses, for instance, glass fibers, mineral wool, basalt wool or powder, cinder wool, etc.

Such fireproofing coatings and compositions are disclosed in the following patents or applications: German DOS 1,471,005, DAS No. 2,513,475, U.S. Pat. No. 3,585,052 and Swiss No. 543,285. Such materials have a strong protective power against fires because of the following reasons: When the fireproofing coating is heated to about 120° C., the alkali-metal silicate layer, which may contain (after hardening) more than 30% residual water, starts to soften while freeing part of that water contained therein. As a consequence, this water evaporates within the softened mass and the latter expands and gives a cellulated structure similar to that of a foam; hence, the coating inflates to a thickness of about 10 to 20 times its initial thickness. When the temperature of the coating exceeds about 250° C., the latter hardens again while maintaining the cellular structure. Such structure imparts to the coating a very high insulating power which corresponds to a thermal conductivity factor of about 0.05 kcal/m$^2$.h. Further, this structure may be stable up to 1000° C. However, such coatings are not suitable for being applied as paint compositions on vertical or slant positioned surfaces. This is so because when the temperature, in case of fire, reaches an interval where the coating becomes initially soft and tumescent (120°–250° C.), the material of the coat will tend to foam-flow and to collapse from the substrate leaving the latter unprotected.

Consequently, if fire-proofing coatings of the type described above must be used to protect vertical or skew surfaces of building elements, they must be formed in the shape of prefabricated panels which, before use, must be first aligned in a horizontal position and preheated not below 250° C. until the hard and stable foamed structure described above has been achieved.

It is an object of the invention to remedy the above described drawbacks by providing a composition which, when applied onto a vertical surface, will furnish a fire-proofing coating that will foam and expand in case of fire without foam-flow and without collapse from the substrate.

It is another object of the invention to provide a composition which is compatible with solid mineral fire-proofing materials and furnish mixed coatings with improved fire-proofing efficiency.

It is a further object of the invention to provide a fire-proofing composition which is clear enough to be applied to glass and hence furnish fireproofing coatings which are transparent or at least translucent enough to allow full passage of visible light.

It is another object of the invention to provide a process for making and applying a fire-proofing composition to substrates which will furnish a fireproofing composition that will not foam-flow in case of fire, even when applied to vertical surfaces.

It is a further object of the invention to provide new fireproofed substrates or building elements with improved fire-resisting properties, particularly with regard to protecting efficiency, economy, and simplicity of manufacture.

Other objects of the invention will become apparent to those skilled in the art in the light of the description hereinafter.

The composition of the invention, which satisfactorily fulfills the objectives set up hereinbefore, is characterized by the fact that it essentially comprises (a) a 40–80% by weight aqueous solution of hydrosoluble alkali-metal silicates and, as a suspension therein, (b) 20 to 60% by weight of solid particles of hydrated hydrosoluble alkali-metal silicates containing 15–20% of water, the molar ratio $SiO_2/Na_2O$ of both said silicates being 2 to 3.5.

The process for applying such composition to a substrate for obtaining a fire-proof coating is characterized by the fact that, before use, one homogeneously mixes together components (a) and (b) and that one applies at least one layer of the resulting suspension to the surface to be protected, this being effected within the time after one has performed said mixing of components (a) and (b) and before said suspension hardens and sets up as a hard mass due to the hydrated silicate particles being in contact with the aqueous silicate solution. This period of time, under usual unprotected conditions of mixing, is rather short, in the order of a few minutes.

It is now likely that the invention is actually based on the inherent properties of solid, water soluble hydrated sodium silicate having 15–20% water within its molecular network and a mole ratio $SiO_2/Na_2O$ from 2 to 3.5. Such solid silicate has the property of rapidly absorbing a certain amount of water when in contact with a water solution.

Thus, when one forms the suspension of particles of solid hydrated sodium silicate within the fluid aqueous sodium silicate solution, part of the water of said latter solution is quickly absorbed by the solid particles of hydrated sodium silicate. This results in a solidification or rapid self-hardening of the solution, the water content of which will decrease to about 30–50% by weight, whereby the hydrated sodium silicate particles do not dissolve and remain solid. During this self-curing period, the viscosity of the suspension increases, in a matter of several minutes, from about 100 poises to about $10^4$–$10^5$ poises. It should also be remembered at this stage that some $CO_2$ of the air will dissolve in the suspension during mixing and will form $H_2CO_3$ therein; it is known that $H_2CO_3$ will function as a cross-linking agent in silicate solutions. Therefore, the presence of $CO_2$ in the air is also a reason for the hardening of the present composition.

Therefore, the application of a layer of the composition on the surface of the substrate to be fire-protected, which is effected between the time when one mixes the components of the composition and the time of setting of the latter, enables one to achieve a hard protective coating without any separate drying of curing operation.

It should be noted now that if one keeps the present composition protected from the air, e.g. by a blanket of $N_2$, the hardening time thereof is significantly increased. It will be therefore possible, if desired, to mix components (a) and (b) under shelter from the air, the storage life of the present composition in the liquid state being then significantly prolonged, e.g. being from about 15 min. to about 2 hrs.

When the temperature of the coating thus obtained is raised to about 120°–250° C., e.g. in case of a fire, the hardened silicate composition liberates some of the water present therein which boils and produces a cellulated structure similar to the silicate "foam" which results from the heating of known silicate based fire-proof coatings. The excess of water which would normally cause foam-flow in the known coatings under such conditions will be absorbed by the solid particles of hydrated sodium silicate of the composition of the invention, thus preventing any collapse of the expanded coating even if the substrate surface is slanted or vertical.

Thus, a cellular structure is progressively formed which extends from the outside of the coating down to the surface of the substrate without any tendency to drop or leave the latter. One finally obtains a foam layer constituted of fine cells which does not burn, strongly resists crushing and possesses a very high insulation power. The density of this layer is in the order of 0.1–0.2 g/cm$^3$ and its melting temperature around 1000° C. Since the foaming pressure is about several atmospheres, the possible presence, over the coating, of an additional protective layer will not prevent the foaming from taking place, the force of swelling will then raise the external coating to a distance corresponding to the thickness increase of the foamed coating.

The solid hydrosoluble particles of hydrated alkali-metal silicate can be obtained by the two following methods:

(1) by spraying a water solution of a water soluble silicate (liquid glass) in a stream of warm air and (2) by spreading a layer of such a water solution of silicate on a heated surface in such way that it dries up and solidifies as a thin transparent layer or plate of silicate which is thereafter lifted and broken into tiny pieces. It will be noted that the particles obtained from (1) above are porous and contain microscopic air bubbles which impart to them a "snowy" appearance. The composition of the invention which contains such particles as prepared under (1) forms opalescent and mat fire-resistant coatings. On the contrary, the particles obtained according to (2) are transparent, somewhat crystal-like and contain no or only few bubbles. Thus the present composition, when making use of such particles prepared as under (2), has a clear aspect which enables one to use it advantageously in the fire-proofing of glass and window panes.

It is advantageous to combine the present composition with a mineral fibrous fire-resistant material in order to increase the overall mechanical resistance thereof. Preferably, such fibrous material is chosen among those materials having a melting point not below 1000°–1100° C. and the decomposition temperature of which, within the reinforced coating, be at least 800° C. This product can be selected from glass and slag wool or carbon fibers. According to a preferred method for using such additional fibrous product, one applies such products over the hardened layer of the composition in a manner such as to render this additional layer integral with the first one. For instance, before such fibrous material is applied over the hardened composition coating, it is impregnated with a liquid aqueous silicate solution, the composition of which is similar or near to that of the solution used as ingredient (a) in the composition of the invention. Such solution will contain from about 30 to 80% by weight of sodium silicate, the ratio $SiO_2/Na_2O$ of which being 2–3.5, the rest (20–70%) being water. According to another advantageous method, one can soak the fibrous material with the silicate solution before applying the former over the hardened composition coating.

Another method to combine the present composition of the invention with an additional fibrous fire-resistant mineral is to mix such mineral with the composition before using the latter for coating on a substrate. In such case, one will incorporate therein about 2–20% of such materials by weight of total coated mixed composition.

Preferably, the fibers of the fibrous mineral will be 10–50 mm. long.

The techniques for applying the composition over the substrates can be any techniques commonly used in the field. For instance, one can use a brush or a spatula or one can proceed by dipping or spraying. The quantity of composition applied will preferably be such that the hardened coating will be about 1–5 mm. thick.

It is possible, before applying the present composition to a substrate, to subject the latter to some kind of pre-treatment. For instance, in the case where the substrate is a steel part such as a steel construction beam, the latter can receive one or several layers of known anti-corrosive substances. Thus, one can pre-treat the piece with an aqueous heated solution containing for instance sodium phosphate, sodium silicate, an organic surfactant and a wetting agent. One can also treat the steel piece with aqueous phosphoric acid containing, in addition, iron, manganese or zinc phosphates. The resulting porous, finely crystalline phosphate layer which forms over the piece effectively protects the latter against possible corrosion and simultaneously procures excellent adhesiveness to the fire-proof coatings obtained from the present composition. The above pre-treatments can be done by any conventional methods, e.g. by dipping, spraying or brushing.

When the part to be protected has received the fire-proofing coat of the invention, it can further receive a final protective coating as a shield against atmospheric corrosion, as a mechanical strength enhancing layer or, simply, for declaration purposes. As such outer protective coatings, one can use any material which will not hurt the composition coating, e.g. paints containing synthetic binders such as styrene-butadiene copolymers, methyl-polymethacrylate, neoprene, etc. or foils of metals, e.g. Al, Cu, Zn, etc. or of resins.

The fire-proof coating obtained according to the invention is especially useful for protecting metallic construction elements, such as building carrier elements, e.g. beams, frame members, pillars, etc., against excessive heat which may be developed in case of a fire. Now, it is known that, around 540° C., steel under stress will lose most of its strength and when some steel carrier structures in a building are heated to such temperature, they may collapse with consequent breakdown of the building. In the case when the coating of the invention also comprises a fibrous mineral as an original additional ingredient of the composition, the protective fire-proofing effect on steel is particularly outstanding because of the combined contribution of the following phenomena which occur when the temperature is raised to a very high degree:

The solid alkali-metal silicate matrix resulting from the hardening of the composition behaves, when heated, as a supersaturated liquid with consequent evolution of steam when the temperature exceeds the atmospheric boiling temperature of water.

This steam generates very fine bubbles which are initiated by the nucleation sites due to the presence of the mineral fibers in the coating.

Therefore, the coating foams only progressively and will take its final cellulated structure consisting of very fine cells with no significant coalescence of the steam bubbles. Thus, such steam bubbles only reach the surface of the coating very slowly and, where they burst, they only produce very tine holes on that surface. Therefore, the foamed coating maintains its strength and cellular structure, which because of its high thermal insulating power, ensures a very efficient protection against heat.

Combining one or more layers of the composition and a water-proof terminal layer to form the coating of the invention procures a further improvement in the protecting effect discussed above because, as long as it is not destroyed by burning, the outer watertight layer prevents the steam bubbles from escaping out of the coating, thus further enhancing the overall fire-proofing effect under given fire conditions. Regarding now the extent of foaming of the coating, it depends essentially on the temperature of the fire and on the time during which the protected pieces are subjected to such temperature.

The following examples (in which parts are given by weight) illustrate the invention in a more detailed manner.

EXAMPLE 1

By using continuous paint mixing equipment comprising compressed aid sprayer mixers, one did mix together (b) 50% by weight of solid particles of hydrated sodium silicate and (a) 50% by weight of a liquid aqueous solution of sodium silicate. The particles had been obtained by spraying some solution (a) in a stream of heated air. Their hydration degree was 17.5% by weight of water. Solution (a) had a density of 1.34 (38° Be') and contained 26.5% $SiO_2$, 7.9% $Na_2O$ and 65.5% $H_2O$, all by weight. The molar ratio $SiO_2/Na_2O$ of (a) and (b) was 3.3 for both.

Right after mixing, the composition was sprayed on a steel beam which had been first prephosphated by immersion in a phosphating bath. The composition, which adhered very strongly to the steel, self-hardened in about 3 minutes and gave a solid, 1.5 mm. thick, silicate coating. Then a 3 mm. thick glass-fiber sheet mat soaked in a silicate solution identical to solution (a) above was placed over the silicate layer where it stuck thereto. After 12 hrs. further setting in air at room temperature, the coating was further covered with a 0.2 mm. thick aluminum sheet which was glued thereon with a polyester resin. In order to achieve this, the liquid resin was first sprayed over the mat and, thereafter, the aluminum sheet was glued onto the mat by the application of slight pressure, e.g. with a roller.

The final composite coating thus obtained had an efficiency at least as high as that defined under standard "ISO F-60" for protecting substrates in case of fires. For instance, the temperature of the substrate surface on the side of the fire did not exceed 140° C. after a 60 minute exposure.

EXAMPLE 2

As described in Example 1, one did mix together 50 parts by weight of a 35% aqueous sodium silicate solution containing 65% $H_2O$ with 50 parts by weight of solid particles of hydrated sodium silicate containing 17% $H_2O$. Such particles were obtained, as in Example 1, from spray-drying the above silicate solution in a heated airstream. Such silicates had a $SiO_2/Na_2O$ ratio of 3.3. The composition which therefore consisted in a suspension of 50% by weight of the total composition hydrated water soluble solid particles and 50% by weight of the total composition of the aqueous 35% silicate solution was applied with a spatula on an untreated panel made of agglomerated wooden chips (NOVO-PAN). Thereafter, a glass fiber mat was applied onto the layer while it was still in liquid form by pressing the mat into the viscous liquid. The amount of mat was 150 g/m².

After 30 minutes standing, the layer was hard and in the form of a white mat-like coating, 1.5 mm. thick. Thereafter, a thin layer of sodium silicate solution was sprayed over the hard mat and a 0.2 thick aluminum foil was applied thereon whereby it adhered strongly.

After 12 hrs. drying, the panel was subjected to the following fire tests: the panel was placed vertically against an open flame of such strength that an unprotected similar panel took fire nearly immediately when placed in the same conditions. Under the effect of the blaze, the protective coating of the test panel expanded to about 20 mm. thickness but did not foam-flow or collapse. Thereafter, the test panel remained unchanged for 15 min. after which the wood started to char and its volatile parts started to distill off but without taking on fire. It is only after 30 min. exposure that the carbonized back side of the panel finally inflamed.

EXAMPLE 3

As described in Example 1, one did mix together, in the presence of air, 45 parts by weight of hydrated, hydrosoluble Na silicate particles (ratio $SiO_2:Na_2O=2.1$), obtained by spray-drying in warm air, with 55 parts by weight of a sodium silicate solution containing 35% solid and 65% water (ratio $SiO_2: Na_2O=3.3$). Thereafter, one did further add and mix therein 4 parts by weight of glass fibers trimmed to 5-10 mm. (E-glass fibers). The mixture was coated by usual means on a mild steel presanded beam. After 45 min. hardening, one obtained a fireproof coating, 2 mm. thick, white and mat. The latter was further covered with a 0.1 mm. polyethylene foil glued with the aqueous solution of silicate.

The protected beam was thereafter subjected, in a vertical position, together with an unprotected control, to the fire test described in Example 2. After 10 min., the control had reached 523° C., a fatal temperature at which steel under load will lose all useful strength. In contrast, after 30 min., the temperature of the protected beam was still not higher than 400° C. The thickness of the swollen coating was about 15 min.

EXAMPLE 4

In a closed vessel, 40 parts by weight of solid particles of hydrated sodium silicate containing 20% $H_2O$ were mixed under $N_2$ with 60 parts by weight of an aqueous sodium silicate solution containing 35% solids by weight. The hydrated sodium silicate particles were obtained from an aqueous silicate solution which was spread out as a thin layer on heated surfaces, namely on warm steel rotating cylinders and allowed to dry until hard; thereafter the dry solid sheets were broken into fine clear particles. Such particles had a mole $SiO_2/Na_2O$ ratio of 2.0; in contrast the ratio $SiO_2:Na_2O$ of the silicate of the above aqueous solution was 3.3.

The mixture was worked up, still under nitrogen, until practically all bubbles had disappeared, the presence of nitrogen preventing the composition from hardening prematurely.

Thereafter, the clear composition was spread with a spatula as a thin layer over a flat glass panel and a second glass panel was placed over the first one and it stuck strongly thereto. After 15 mm. hardening, the thickness of the sandwiched layer was about 1 mm. and the whole laminate was transparent and slightly milky.

When the glass panel thus prepared was heated with an open flame, the first glass layer was broken but the glass fragments remained attached to the second panel, which did not break, by means of the intermediate silicate coating. The latter expanded without flowing until a protective foam about 20 mm. thick had formed.

We claim:

1. A method for protecting a substrate from fire damage by coating said substrate with a tumescent material, said method comprising the steps of:
    (a) mixing hydrated alkali-metal silicate particles in an aqueous solution of alkali metal silicate to form a suspension of said particles, said particles containing 15 to 20 weight percent of water as water of hydration prior to said mixing step, said aqueous solution containing 40 to 80 weight percent dissolved alkali-metal silicate and 60 to 20 weight percent water prior to said mixing step
    (b) applying a layer of said suspension to said substrate to form a coating thereon prior to significant absorption of water from said solution portion of said suspension by said particles.

2. The method of claim 1 wherein said alkali-metal silicate is sodium silicate having an $SiO_2/Na_2O$ molar ratio in the range of from 2 to 3.5.

3. The method of claim 1 wherein said mixing step includes preventing exposure of said suspension to oxygen.

4. The method of claim 1 wherein said alkali-metal particles were formed by drying an aqueous solution of alkali-metal silicate.

5. The method of claim 4 wherein said coating is rendered substantially opaque to visible light by drying the aqueous solution used to form said particles in a stream of warm air.

6. The method of claim 4 wherein said coating is rendered substantially transparent to visible light by drying the aqueous solution used to form said particles in the form of a film on a heated solid surface and thereafter fracturing said film to form said particles therefrom.

7. The method of claim 1, including the step of adhering a protective coating to the outer surface of said coating.

8. The method of claim 1 wherein reinforcing fibers are also mixed into said suspension.

9. The method of claim 8 wherein said fibers comprise 2 to 20 weight percent of the total weight of said coating.

10. The method of claim 1 including the step of adding a layer of fibers to the outer surface of said coating.

11. The method of claim 10 including the step of soaking said fibers in a solution having a composition substantially similar to said aqueous solution prior to adding said fibers to said outer surface.

12. The method of claims 8 and 10 wherein said fibers are composed of a material selected from the group consisting of glass, rock wool and carbon.

13. The method of claim 10 including the step of adhering a protective coating to the outer surface of said layer of fibers.

14. A method for protecting a glass substrate from fire damage by coating said substrate with a tumescent material that is substantially transparent to visible light, said method comprising the steps of:
    (a) mixing hydrated alkali-metal silicate particles in a first aqueous solution of alkali-metal silicate to form a suspension of said particles, said particles having been formed by the drying of an aqueous alkali-metal solution on a heated solid surface to form a solid substantially transparent film thereon, said film containing 15 to 20 weight percent water as water of hydration, said film being fractured to form said particles, said first aqueous solution containing 40 to 80 weight percent dissolved alkali-metal silicate and 20 to 60 weight percent water prior to said mixing step (b) applying a layer of said suspension to said glass substrate to form a substantially transparent coating thereon prior to significant absorption of water from said solution portion of said suspension by said particles.

15. The method of claim 14 wherein said alkali-metal silicate is sodium silicate, said silicate of said first aqueous solution and said particles having an $SiO_2/Na_2O$ ratio in the range of from 2 to 3.5.

16. The method of claim 14 including the step of applying a protective coating to the outer surface of said transparent coating.

17. The method of claim 16 wherein said protective coating is a layer of glass.

* * * * *